(12) United States Patent
Simsek et al.

(10) Patent No.: US 8,860,249 B2
(45) Date of Patent: Oct. 14, 2014

(54) POWER ALLOCATION TO DOWNHOLE TOOLS IN A BOTTOM HOLE ASSEMBLY

(75) Inventors: Burc Simsek, Sugar Land, TX (US); Raphael Gadot, Houston, TX (US); Daniel Codazzi, Gif sur Yvette (FR); Randall P. Leblanc, Katy, TX (US); Gilles Vie, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 871 days.

(21) Appl. No.: 12/962,794

(22) Filed: Dec. 8, 2010

(65) Prior Publication Data

US 2012/0146415 A1 Jun. 14, 2012

(51) Int. Cl.
*H02J 3/14* (2006.01)

(52) U.S. Cl.
CPC ........................................ *H02J 3/14* (2013.01)
USPC ................................ 307/38; 166/57; 166/302

(58) Field of Classification Search
CPC ............... E21B 1/00; E21B 44/00; H02J 3/14
USPC ............................................................ 307/38
See application file for complete search history.

(56) References Cited

U.S. PATENT DOCUMENTS

| 4,899,112 | A | 2/1990 | Clark et al. |
| 6,557,063 | B1 | 4/2003 | Wang et al. |
| 2003/0079152 | A1* | 4/2003 | Triece .......................... 713/322 |
| 2003/0085816 | A1 | 5/2003 | Baird et al. |
| 2004/0255066 | A1* | 12/2004 | Zhang et al. ................. 710/107 |
| 2006/0162934 | A1 | 7/2006 | Shepler |
| 2006/0191687 | A1 | 8/2006 | Storm et al. |
| 2007/0029112 | A1* | 2/2007 | Li et al. ........................... 175/26 |
| 2007/0220190 | A1* | 9/2007 | Hidai et al. ................... 710/110 |
| 2008/0007424 | A1* | 1/2008 | Hall ........................... 340/854.8 |
| 2009/0284345 | A1* | 11/2009 | Ghabra et al. ............... 340/5.61 |
| 2010/0017654 | A1* | 1/2010 | Wishneusky .................... 714/15 |
| 2010/0165213 | A1* | 7/2010 | Knutson et al. ............... 348/731 |
| 2011/0226470 | A1* | 9/2011 | Latrille et al. ........... 166/250.01 |

OTHER PUBLICATIONS

International Search Report and Written Opinion of the International Searching Authority of PCT International Patent Application No. PCT/US2011/063693 dated Jun. 29, 2012.

* cited by examiner

*Primary Examiner* — Rexford Barnie
*Assistant Examiner* — Toan Vu
(74) *Attorney, Agent, or Firm* — Kimberly Ballew

(57) ABSTRACT

The present disclosure relates to a method to allocate electrical power among tools in a bottomhole assembly disposed in a wellbore. A bottomhole assembly having an electric generator, an electrical bus, a bus master, and two or more tools is provided. One or more of the two or more tools has selectable power modes. Electrical power, up to a maximum output value, is provided through the electrical bus to the two or more tools using the electric generator. Electronic components of the two or more tools are synchronized, using the bus master to select a normal power mode or a low power mode for each tool having selectable power modes. The combined power requirements of the two or more tools at any given time do not exceed the maximum output value.

8 Claims, 5 Drawing Sheets

POWER ALLOCATION TO DOWNHOLE TOOLS IN A BOTTOM HOLE ASSEMBLY

CROSS-REFERENCE TO OTHER APPLICATIONS

N/A

BACKGROUND

1. Technical Field

The present disclosure relates generally to making measurements of subsurface formations surrounding a wellbore using a bottomhole assembly (BHA) that is integral to a drill string, and particularly to the allocation of electrical power among the downhole tools comprising the BHA.

2. Background Art

Logging tools have long been used in wellbores to make, for example, formation evaluation measurements to infer properties of the formations surrounding the borehole and the fluids in the formations. Common logging tools include electromagnetic tools, nuclear tools, and nuclear magnetic resonance (NMR) tools, though various other tool types are also used.

Early logging tools were run into a wellbore on a wireline cable, after the wellbore had been drilled. Modern versions of such wireline tools are still used extensively. However, the need for information while drilling the borehole gave rise to measurement-while-drilling (MWD) tools and logging-while-drilling (LWD) tools. MWD tools typically provide drilling parameter information such as weight on the bit, torque, temperature, pressure, direction, and inclination. LWD tools typically provide formation evaluation measurements such as resistivity, porosity, and NMR distributions (e.g., T1 and T2). MWD and LWD tools often have components common to wireline tools (e.g., transmitting and receiving antennas), but MWD and LWD tools must be constructed to not only endure but to operate in the harsh environment of drilling.

A BHA typically includes a single MWD tool and several LWD tools that are connected by a low power transmission wire or bus called the "LTB". The LTB provides power to the logging tools and also provides a communication link by which the tools can communicate with one another. The source of this power is a turbine generator in the MWD tool that is driven by pressurized drilling fluid ("mud") when mud pumps are on. The MWD turbine generator, however, can only provide a limited amount of power. Thus, this restricts the possible configurations of a BHA, or at least limits the number of tools in a BHA that can be operated simultaneously.

SUMMARY

The present disclosure relates to a method to allocate electrical power among tools in a bottomhole assembly disposed in a wellbore. A bottomhole assembly having an electric generator, an electrical bus, a bus master, and two or more tools is provided. One or more of the two or more tools has selectable power modes. Electrical power, up to a maximum output value, is provided through the electrical bus to the two or more tools using the electric generator. Electronic components of the two or more tools are synchronized, using the bus master to select a normal power mode or a low power mode for each tool having selectable power modes. The combined power requirements of the two or more tools at any given time do not exceed the maximum output value.

Other aspects and advantages will become apparent from the following description and the attached claims. The accompanying drawings, described below, illustrate typical embodiments of the invention and are not to be considered limiting of the scope of the invention, for the invention may admit to other equally effective embodiments. The figures are not necessarily to scale, and certain features and certain view of the figures may be shown exaggerated in scale or in schematic in the interest of clarity and conciseness.

DETAILED DESCRIPTION

Some embodiments will now be described with reference to the figures. Like elements in the various figures will be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship as appropriate.

Figure 1:
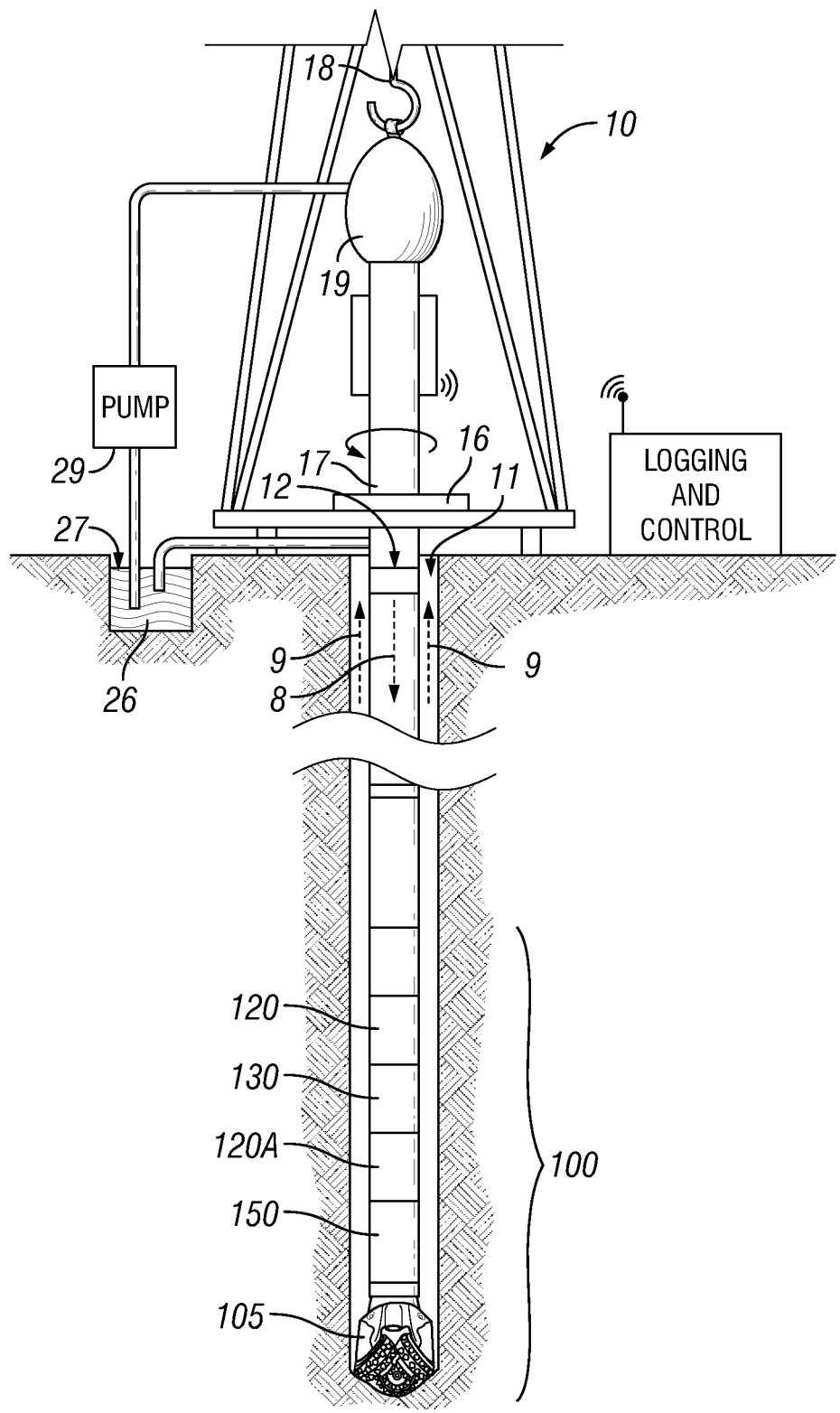
FIG. 1 illustrates an exemplary well site system.

FIG. 1 illustrates a well site system in which various embodiments can be employed. The well site can be onshore or offshore. In this exemplary system, a borehole 11 is formed in subsurface formations by rotary drilling in a manner that is well known. Some embodiments can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick/slip measuring device, a direction measuring device, and an inclination measuring device.

Recent electromagnetic logging tools use one or more tilted or transverse antennas, with or without axial antennas. Those antennas may be transmitters or receivers. In certain embodiments, a tilted antenna, such as one whose dipole moment is neither parallel nor perpendicular to the longitudinal axis of the tool, can be used. A transverse antenna, such as one whose dipole moment is perpendicular to the longitudinal axis of the tool, and/or an axial antenna one whose dipole moment is parallel to the longitudinal axis of the tool, also can be used. Moreover, two antennas can be said to have equal angles if their dipole moment vectors intersect the tool's longitudinal axis at the same angle. For example, two tilted antennas can be said to have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have substantially equal angles of substantially 90 degrees, and that is true regardless of their azimuthal orientations relative to the tool.

LWD tools can be generally classified as logging tools or stationary tools. Logging tools are active and take measurements while the BHA is drilling or tripping. On the other hand, stationary tools require the BHA to stop at a station to take a measurement. As indicated above, an example of a logging tool is a resistivity tool that can actively take measurements while drilling by firing a transmitter and performing some measurement(s) on the signal received by a receiver. Characteristics of the formation can be determined based on the received data. An example of a stationary tool is a sampling tool, which requires the BHA to stop moving and rotating. The sampling tool can then deploy a probe to make contact with the formation to measure the formation fluid pressure or take a fluid sample.

The acquisition modules comprising a LWD tool usually operate asynchronously from the tool's or BHA's recording and communication modules. In general, the power requirements of a LWD tool vary from providing only a few watts, to providing sufficient power for components such as the basic communication and recording modules, or to provide a significantly greater amount of power to, for example, fire transmitters, synchronize receivers, or perform computer-intensive computations on the received data.

Figure 2:
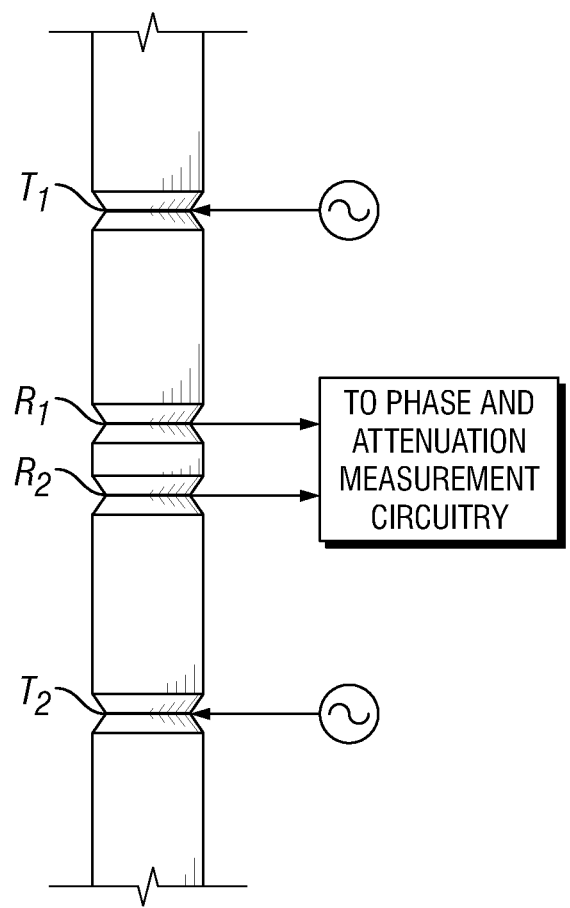
FIG. 2 shows a prior art downhole logging tool.

An example of a tool which can be the LWD tool 120, or can be a part of an LWD tool suite 120A of the system and method hereof, is the dual resistivity LWD tool disclosed in U.S. Pat. No. 4,899,112 and entitled "Well Logging Apparatus And Method For Determining Formation Resistivity At A Shallow And A Deep Depth," incorporated herein by reference. As seen in FIG. 2, upper and lower transmitting antennas, $T_1$ and $T_2$, have upper and lower receiving antennas, $R_1$ and $R_2$, therebetween. The antennas are formed in recesses in a modified drill collar and mounted in insulating material. The phase shift of electromagnetic energy as between the receivers provides an indication of formation resistivity at a relatively shallow depth of investigation, and the attenuation of electromagnetic energy as between the receivers provides an indication of formation resistivity at a relatively deep depth of investigation. The above-referenced U.S. Pat. No. 4,899,112 can be referred to for further details. In operation, attenuation-representative signals and phase-representative signals are coupled to a processor, an output of which is coupleable to a telemetry circuit.

Figure 3:
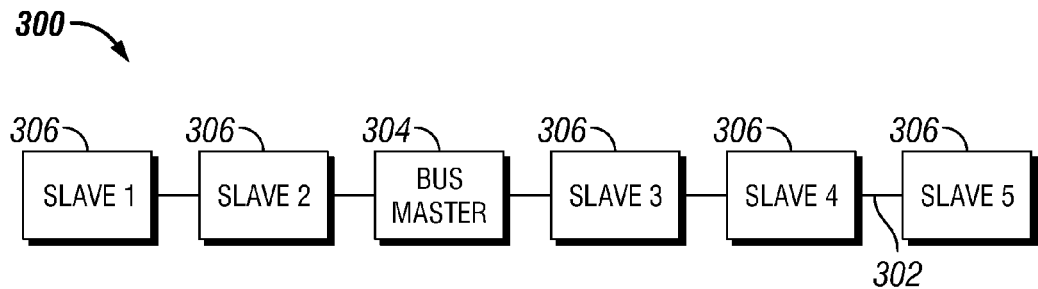
FIG. 3 is a schematic drawing showing a prior art BHA in which various tools are interconnected by an electrical bus.

FIG. 3 is a schematic drawing showing a prior art BHA 300 in which various tools are interconnected using an LTB 302. A bus master 304 (e.g., an MWD tool) controls slaves 306 (e.g., the LWD tools). A slave 306 may not be able to initiate a communication. Bus master 304 specifies which slave 306 should operate by placing an address (e.g., tool ID) in the header of a communication packet. All slaves 306 parse the incoming communication and only "reply" or take action if the address in the communication header matches their own. In this architecture, methods exist to allow slaves 306 to request mastership of the bus 302 from bus master 304 for a specific amount of time.

Figure 4:
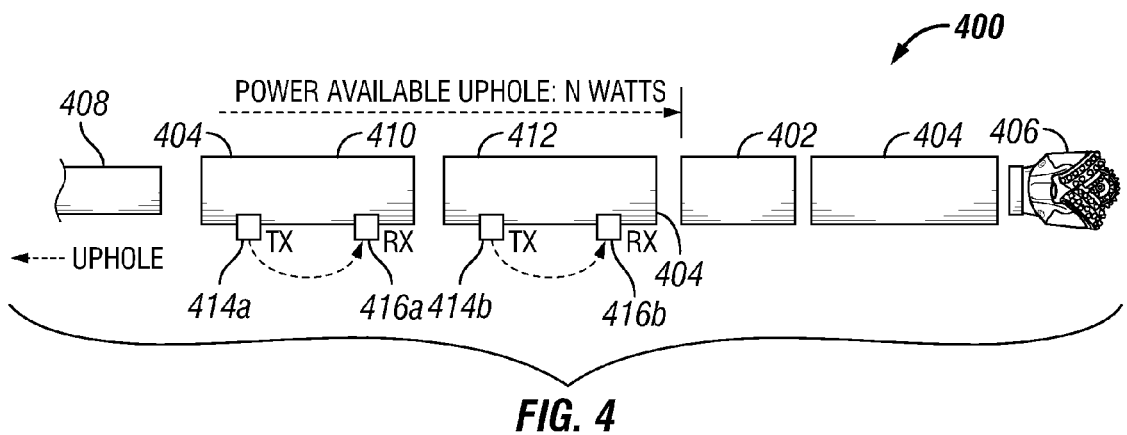
FIG. 4 is a schematic drawing showing an exemplary BHA comprising an MWD tool and multiple logging tools, in accordance with one embodiment in the present disclosure.

FIG. 4 shows an exemplary BHA 400 comprising MWD tool 402 and multiple logging tools 404. In this embodiment, BHA 400 also includes a drill bit 406 and drill string 408. A first logging tool 410 and a second logging tool 412, uphole of MWD tool 402, each have one or more transmitters 414a, 414b and receivers 416a, 416b. MWD module 402 can supply a total of N watts of power to uphole logging tools 410, 412. Transmitter 414a consumes up to A watts of power when transmitting, and transmitter 414*b* consumes up to B watts when it transmits. The sum of A and B is greater than N. Thus, logging tools 410, 412 cannot transmit simultaneously because their power requirements exceed the MWD tool's power supply capacity.

Generally, however, the measurements taken by first logging tool 410 and second logging tool 412 are independent and it is not required that they operate at the same time. The power consumption of first logging tool 410 is reduced from A to "a" when in idle mode (i.e., not operating), and similarly, the power consumption of second logging tool 412 is reduced from B to "b" when it is in idle mode. Sequencing the firing of transmitter 414*a* and transmitter 414*b* reduces the total power requirements (e.g., A+b or B+a) to something less than N. Thus, by synchronizing certain electronics of individual tools so that their combined power requirements at any given time do not exceed the power supply capacity of MWD tool 402, more tools can be included in BHA 400 than was previously possible.

Alternatively, more complicated tools having larger power requirements (that perhaps, if all electronic components were activated simultaneously, would exceed N) may be incorporated into BHA 400 since the combined power demand from all the tools, or even the power consumption within a single tool, is synchronized so as not to exceed the power available at any given time. The hardware and software/firmware to control and implement the synchronization can be incorporated, for example, into the individual tools of BHA 400, and the synchronization may be performed while BHA 400 is on the drill string and in the wellbore.

Figure 5:
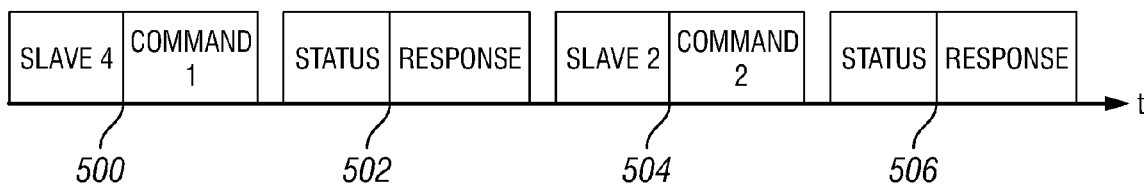
FIG. 5 illustrates an embodiment in which the synchronization is controlled by a central resource, in accordance with one embodiment in the present disclosure.

FIG. 5 illustrates one embodiment of the above-described synchronization being controlled by a central resource. In this embodiment, a single point of control is used to regulate all the power consumers in the BHA. The BHA includes, for example, the LWD tools "slave2" and "slave4". All tools maintain an idle status until instructed by the bus master to perform a specific action. The bus master issues a command to an individual tool or a combination of tools, instructing it or them, as the case may be, to make, for example, one or more measurements, thereby overseeing and insuring that all available power is distributed such that the total power demand does not exceed the power available. In the particular example of FIG. 5, Command1, targeted to slave4 and instructing slave4 to take a measurement, is placed on the bus (step 500). Slave4 responds by performing the commanded operation (step 502) while all other tools ignore the command and remain in idle mode. A further command, Command2, targeted to slave2 and instructing it to take a measurement, is subsequently placed on the bus (step 504). Slave2 responds by performing the commanded operation (step 506) while all other tools ignore the command and remain in idle mode. This particular embodiment requires a high bandwidth communication bus to achieve a high rate of recording of the tools.

Figure 6:
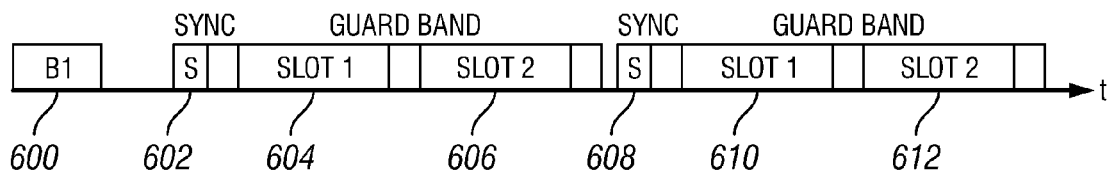
FIG. 6 illustrates an embodiment in which the synchronization is achieved by individual control, in accordance with one embodiment in the present disclosure.

Alternatively, the synchronization can be achieved by individual control, as shown in FIG. 6. In this embodiment, a single point of control provides a synchronization signal to the tools in the BHA. The tools use this information to operate within pre-defined time slices that preferably do not overlap. When using individual control, direct intervention by the bus master is not required. In the specific example shown in FIG. 6, the bus master sends information about the time slicing (step 600). The bus master further provides a synchronization signal (step 602). A tool, or a particular combination of tools, can then operate within its respective time slice (steps 604, 606). The synchronization signal can be repeated (step 608), and the various tools can again operate in their respective slots or time slices (steps 610, 612). FIG. 6 also shows guard bands that help insure adequate delay to prevent accidental or inadvertent power budget overages.

Figure 7:
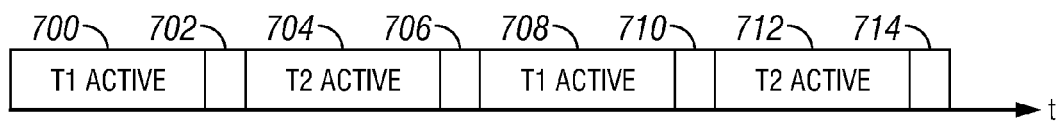
FIG. 7 shows an embodiment of a "token-based" approach, in which a distributed control mechanism is employed whereby individual tools can operate only if in possession of a "token", in accordance with one embodiment in the present disclosure.

A further embodiment is shown in FIG. 7. In this "token-based" approach, a distributed control mechanism is employed whereby individual tools can operate only if in possession of a "token". The token is not meant to be a physically material object such as a coin, but instead is contemplated as an electronic bit of information that can be readily passed from one electronic component to another. The token can be handed out by the bus master or passed from tool to tool in various ways, as is well known in the art of network topologies. In FIG. 7, Tool 1 initially has the token and therefore operates to make its measurement (step 700). At some point, the token is passed to Tool 2 (step 702) and Tool 2 becomes operational (step 704). Subsequently, the token is passed backed to Tool 1 (step 706) to make it resume operation (step 708), and similarly, Tool 2, upon receiving the token from Tool 1 (step 710) resumes operations (step 712). This process is repeated or modified as desired.

It is often desirable to optimize power consumption based on whether the BHA is stationary or moving. That is, one way to optimize power consumption is to place logging tools in idle or low power mode when the BHA is stationary, and to place stationary tools in idle or low power mode when the BHA is moving. That allows one tool type (stationary or logging) to consume the lion's share of the available power while the other tool type consumes as little power as is practicable.

Figure 8:
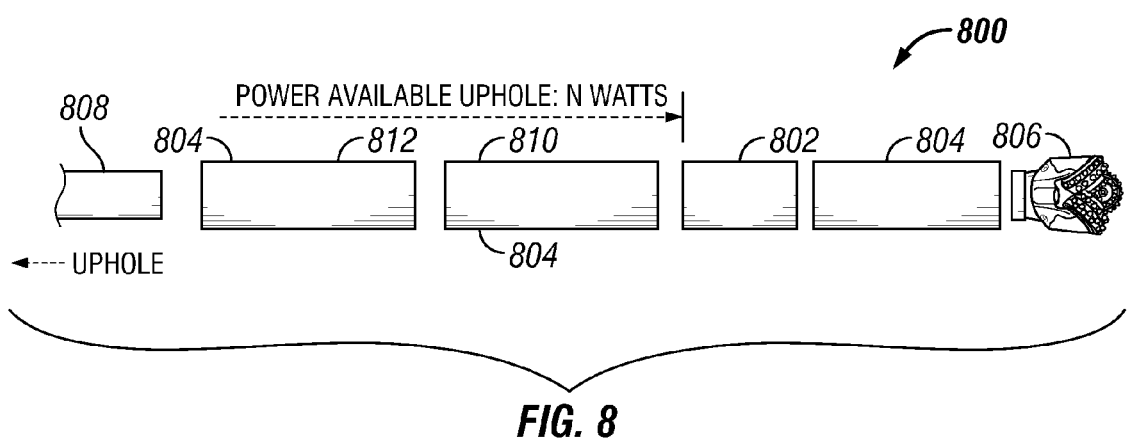
FIG. 8 is a schematic drawing showing an exemplary BHA comprising an MWD tool and multiple LWD tools, in accordance with one embodiment in the present disclosure.

FIG. 8 schematically shows an exemplary BHA 800 comprising MWD tool 802 and multiple LWD tools 804. In this embodiment, BHA 800 also includes a drill bit 806 and drill string 808. A first logging tool 810 and a stationary tool 812 are disposed in BHA 800 uphole of MWD tool 802. MWD module 802 can supply a total of N watts of power to uphole logging tools 810, 812. Stationary tool 812 consumes up to A watts of power when actively operating, e.g., when BHA 800 is stationary, and first logging tool 810 consumes up to B watts of power when actively operating, e.g., while drilling. The sum of A and B is greater than N. However, logging tool 810 and stationary tool 812 typically do not need to operate simultaneously. Non-operating tools can instruct their electronics to shut down specific sections to reduce current usage, bringing the combined power requirements within the MWD tool's power supply capacity. That is, if stationary tool 812 requires only "a" watts when selected portions of its electronics are shut down, and, similarly, logging tool 810 requires only "b" watts when selected portions of its electronics are shut down, the combined usage, say A+b or B+a, is less than N.

The hardware and software/firmware to control and implement the shut down of selected electronics can be incorporated, for example, into the individual tools of BHA 800, in various locations within drill string 808, or in a surface telemetry system. While the above description refers to the power available to and required by tools uphole of MWD tool 802, the same practice applies equally to tools downhole of MWD tool 802. The method can also apply to multiple logging and stationary tools 810, 812.

In practice, MWD tool 802 acts as the gatekeeper, using a periodic broadcast to send a power status to all tools in BHA 800. The presence of a special key variable in that broadcast allows tools that are listening to determine whether the shut down feature is enabled. MWD tool 802 can use this broadcast to instruct all tools to enter stationary or logging mode. In this embodiment, the MWD tool 802 decides when to change this status based on information supplied by stationary tool 812.

When appropriate, stationary tool 812 initiates a request to have BHA 800 enter stationary mode (i.e., logging tools go to low power mode). For example, when a test or other action is to be performed, stationary tool 812 will "raise a flag" (e.g., flip a bit) and wait for MWD tool 802 to poll it and determine this status. Once MWD tool 802 receives this information, it broadcasts "stationary mode" on the LTB. Once stationary tool 812 confirms that MWD tool 802 has instructed BHA 800 to enter stationary mode, it will perform its operation.

Logging tools 810 monitor the LTB for instructions from MWD tool 802 to enter stationary mode. If instructed to do so, logging tools 810 turn off power to specific sections of their respective tool (e.g., transmitters, receivers, acquisition boards, etc.) to reduce the power demands on MWD 802.

Surface monitoring and control software can monitor the status of the shut down feature, enable or disable the shut down feature, and activate the feature. The enabling and disabling is typically done during surface initialization of individual tools. In one embodiment, MWD tool 802 is the only tool that requires the feature to be activated. As a frame is being programmed in MWD tool 802 at the surface, an option is given to a user to enable or disable the feature. The monitoring of the status of the power mode can be performed by having MWD tool 802 use telemetry to send the status of the MWD broadcast to the surface. Because stationary tool 812 initiates the request to enter stationary mode, any downlinks to the tool are modified to mean enter stationary mode, while instructing the remainder of BHA 800 to enter a low power state.

Figure 9:
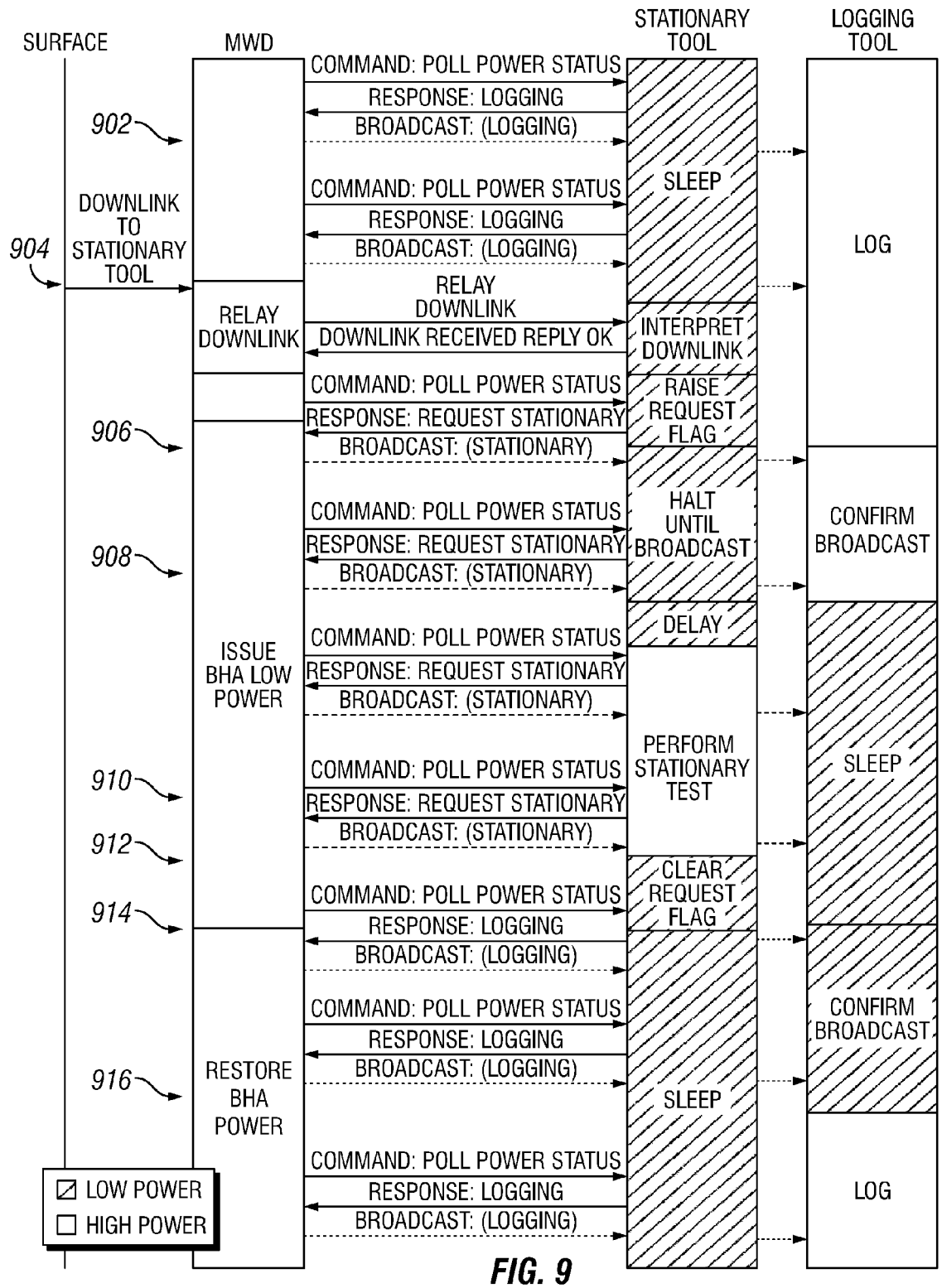
FIG. 9 is a schematic drawing showing specific steps taken in a exemplary operational sequence using the embodiment of FIG. 8, in accordance with one embodiment in the present disclosure.

A detailed example to illustrate the above-described embodiment is shown in FIG. 9. Specific steps are called out to illustrate a possible operational sequence. During regular operations, the BHA power sharing mode is enabled on the bus master and the stationary tool. The bus master broadcasts an instruction for logging tools to be operational in normal power mode. Stationary tools are maintained in their "sleep state" or low power mode (step 902). At some desired time, a source, such as a surface control device, issues a command directed to a stationary tool (step 904). The stationary tool interprets the downlinked command and, if the command is interpreted to mean change the tool's power requirement, the tool raises or sets a flag and enters a halted state (step 906). During this halted state and before proceeding, the stationary tool waits to receive confirmation from the MWD tool that the MWD tool has commanded the BHA logging tools to enter low power mode. The bus master, periodically polling the stationary tool, detects the flag and issues a command to the BHA logging tools to enter low power mode. The logging tools that receive this command and are able to enter a low power state do so (step 908).

Upon receiving confirmation of its request, and after a short delay to allow sufficient time for the BHA to enter low power mode, the stationary tool performs its normal deployed operations (e.g., pressure test or draw sample) (step 910). The flag to request low power mode remains set while those deployed operations are being performed. The bus master monitors the stationary tool and continues to broadcast the command for low power mode so long as that flag is set (step 912). Once the stationary tool completes its operations, it enters its sleep state and clears the flag (step 914). The bus master, upon detecting the clearing of the flag, sends a command to the BHA to enter regular logging mode and the logging tools then resume regular operations in normal power mode (step 916).

It should be appreciated that while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to allocate electrical power among tools in a bottomhole assembly disposed in a wellbore, comprising:
   providing a bottomhole assembly having an electric generator, an electrical bus, a bus master, and two or more tools, wherein one or more of the two or more tools has selectable power modes, and wherein the two or more tools includes at least stationary tool and at least one logging tool;
   providing electrical power, up to a maximum output value, through the electrical bus to the two or more tools using the electric generator;
   using the bus master to perform a bus master function, the bus master function comprising broadcasting time slice information and a synchronization signal, wherein the bus master function further comprises at least one of placing the stationary tool in the stationary tool's low power mode when operating the logging tool, and placing the logging tool in the logging tool's low power mode when operating the stationary tool;
   operating one or more of the two or more tools, each during its respective time slice, wherein the combined power requirements of the two or more tools at any given time do not exceed the maximum output value; and
   using the stationary tool to initiate a power status change request, wherein the stationary tool initiates a power status change request by setting a flag, and wherein using the bus master comprises detecting the flag set by the stationary tool and broadcasting a power status command to the logging tool and the stationary tool.

2. The method of claim 1, further comprising including a wait time between time slices.

3. The method of claim 1, wherein using the bus master comprises periodically broadcasting the power status command to the logging tool and the stationary tool.

4. The method of claim 1, further comprising confirming, by the stationary tool, the broadcast of the power status command, and performing operations with the stationary tool only after receiving the confirmation.

5. The method of claim 1, wherein the flag remains set until operations by the stationary tool are completed.

6. The method of claim 5, wherein upon the stationary tool completing the stationary tool's operations, the stationary tool reverts to the stationary tool's low power state and clears the flag.

7. The method of claim 6, wherein upon detecting the cleared flag, the bus master commands the logging tool to enter the logging tool's normal power state.

8. The method of claim 1, further comprising using a surface device to cause the stationary tool to initiate the power status change request.

* * * * *